United States Patent
Murphy et al.

(10) Patent No.: US 7,561,105 B2
(45) Date of Patent: Jul. 14, 2009

(54) EMITTER LOCATING USING TIME-DIFFERENCE-OF-ARRIVAL (TDOA) TECHNIQUES

(75) Inventors: Robert A. Murphy, Weatherford, TX (US); Peter Kocur, Fort Worth, TX (US); Layne G. Lenning, Keller, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/146,842

(22) Filed: Jun. 7, 2005

(65) Prior Publication Data

US 2006/0273960 A1    Dec. 7, 2006

(51) Int. Cl.
*G01S 3/02* (2006.01)
(52) U.S. Cl. ..................................... 342/465
(58) Field of Classification Search ............. 342/387, 342/465
See application file for complete search history.

(56) References Cited

U.S. PATENT DOCUMENTS 4,215,345 A * 7/1980 Frosch et al. .............. 342/465

2003/0080992 A1 * 5/2003 Haines ...................... 345/734

* cited by examiner

*Primary Examiner*—Thomas H Tarcza
*Assistant Examiner*—Nga X Nguyen
(74) *Attorney, Agent, or Firm*—Bracewell & Giuliani LLP (57) ABSTRACT

The present invention provides a method of selecting receiving pairs from a set of at least three receivers that may be used to localize an emitter. This involves identifying the set of at least three receivers to be used to localize the emitter. An isochron may be developed for each receiver pair wherein each isochron has a finite width. The intersection of two isochrons creates an uncertainty parallelogram. When the intersection of two isochrones is substantially orthogonal or subtends a relatively large angle, uncertainty based on the intersection angle is minimized and uncertainty becomes primarily a function of isochron width. To determine acceptable or best receiver pairs to be used, the intersections of each isochron pair may be analyzed. The uncertainty parallelograms and intersection angles are compared for each pair of intersecting isochrons. Then, receiver pairs that produced the isochrons that result in a reduced or compact uncertainty parallelogram may be selected.

6 Claims, 9 Drawing Sheets

EMITTER LOCATING USING TIME-DIFFERENCE-OF-ARRIVAL (TDOA) TECHNIQUES

GOVERNMENT INTEREST

This invention was made with government support under contract number N00019-02-C-3002 awarded by The Department of the Navy. The Government has certain rights in this invention.

TECHNICAL FIELD OF THE INVENTION

The present invention relates generally to localizing an emitter, and more particularly, a system and method operable to localize an emitter based upon the reception of the emitter's transmitted electromagnetic energy with a series of receivers utilizing a time difference of arrival technique that reduces uncertainty.

BACKGROUND OF THE INVENTION

The ability to determinate the location of an emitter based upon the reception of its transmitted electromagnetic energy has many military and commercial applications. Military applications include locating the emitters associated with enemy weapon and communication systems. Commercial applications include locating cell-phones for emergency services (E-911), a requirement mandated by the FCC for wireless carriers in the United States. Other uses include the ability to locate stolen vehicles and other items which transmit distress signals (i.e. similar to LOJAC and ONSTAR). Inventory or items marked by RFID tags can be located, as well. These uses may all be enhanced by minimizing the uncertainty associated with locating the emitter.

Historically, interferometric Direction Finding (DF) techniques have been utilized for emitter location. However, the accuracy obtained from DF techniques is not sufficient in all instances. When multiple, spatially-separated antenna/receiver systems detect a signal transmitted by an emitter, the signal is detected by each of the antenna/receiver systems at a different Time-Of-Arrival (TOA). The range from the emitter to the antenna/receiver system of interest determines the TOA of the signal at each antenna/receiver system. Since the emitted electromagnetic waves propagate at the speed of light, the emitter's location may be inferred based upon the time difference of a signal's arrival at each antenna/receiver system. This requires that the location of each system be known and the receivers share a common time-reference. Emitter location methods based upon different reception times of a signal by spatially separated antenna/receiver systems are referred to as Time-Difference-Of-Arrival (TDOA) techniques. Often, TDOA emitter location techniques offer a vast improvement in accuracy over that provided by DF techniques.

Figure 1:
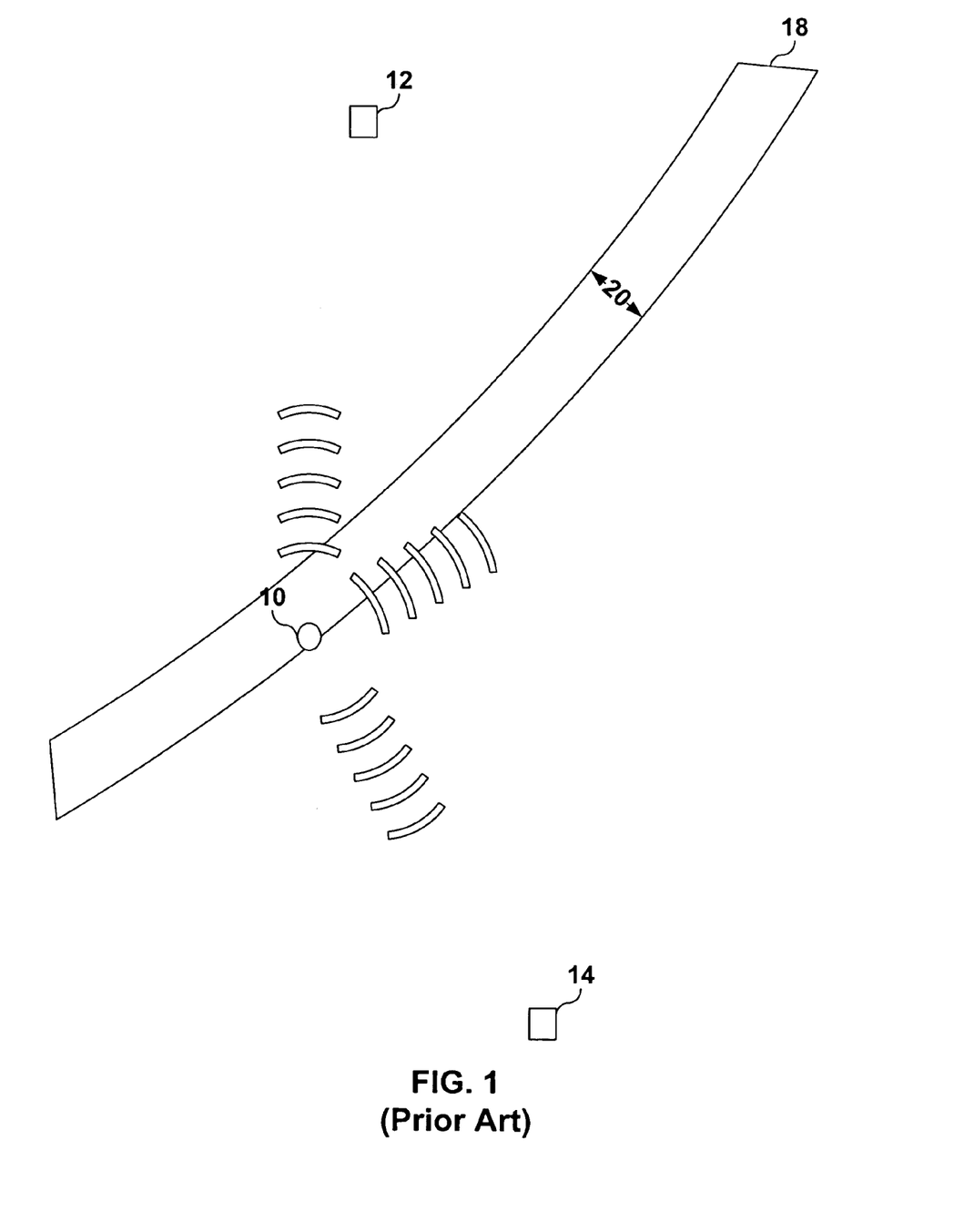
FIG. 1 depicts an isochron developed by two receivers to locate an emitter.

FIG. 1 depicts the TDOA measured between a pair of antenna/receiver systems 12 and 14 that produces a hyperboloid of revolution that describes the possible emitter 10 locations with respect to the positions of the receivers. The intersection of this hyperboloid with the Earth's surface forms a contour 18 of constant TDOA that describes the possible location of the emitter. This contour may be referred to as an "isochron". Isochrons are not infinitely thin. Each isochron possesses a thickness, or width 20, that is a function of the geometry between the antenna/receiver pairs 12 and 14 with respect to emitter 10. The width is also a function of errors inherent in the measurement of the TOA of the signal at each of the receivers and the error associated with the knowledge of the receivers' positions. A single isochron 18 cannot determine the location of emitter 10. Rather, the intersection of at least two isochrons is required to determine the location of emitter 10. Since the isochrons have an associated thickness 20, the intersection of isochrons produces an uncertainty region that includes the true location of the emitter. Traditionally, the error between the estimated emitter location and the true emitter location is statistically expressed as a Circular Error Probable (CEP) Target Location Error (TLE) value.

As these errors are often uncharacterized and assumed to be equal, a need exists for the ability to properly evaluate and minimize the error or width of any given isochron and the CEP TLE associated with a pair of isochrons.

SUMMARY OF THE INVENTION

Embodiments of the present invention provide a method of selecting receiving pairs from a set of at least three receivers that may be used to localize an emitter. This invention substantially addresses the above identified needs as well as others. This involves identifying the set of at least three receivers to be used to localize the emitter. An isochron may be developed for each receiver pair wherein each isochron has a finite width. The intersection of two isochrons creates an uncertainty parallelogram. As the intersection angle of two isochrones approaches 90 degrees, uncertainty is minimized and becomes solely a function of the width of the isochrons. To determine acceptable or best receiver pairs to be used, one must analyze the intersections of each isochron pair associated with the available receiver pairs. The uncertainty parallelograms and intersection angles are compared for each pair of intersecting isochrons. Then, receiver pairs that produced the isochrons that result in a reduced or compact uncertainty parallelogram may be selected. The width of each isochron may be based on the time and position errors associated with individual receivers and the electromagnetic signal produced by the emitter and received by the receiver.

Another embodiment provides an emitter locating system. This system includes at least three receivers operable to receive an electromagnetic signal from the emitter. A reference time and positioning system is operably or communicatively coupled to the receivers such that a common frame of reference is used for time and positioning of the receivers. A processor operably couples to the receivers and will develop three isochrons from the three receivers. In general, for n receivers, there are $n(n-1)/2$ pairs which each contribute one isochron. These three isochrons are explicitly shown in FIG. 3. Each isochron is associated with a unique pair of receivers, the received electromagnetic signals, and the referenced time and positioning system. Each isochron has finite width depending on the time and positioning errors associated with the individual receivers, and propagation errors associated with the transmission path of the electromagnetic signal. The processor may determine an uncertainty parallelogram from the intersection of each pair of isochrones, within which the emitter is located. This uncertainty parallelogram may be described as having an area, a minor diagonal, and a major diagonal. The processor compares the uncertainty parallelograms associated with each pair of isochrons. This comparison may be based on the area and the ratio of the minor diagonal to the major diagonal, or a comparison of the parallelogram with a circular error probability (CEP). Isochrons are selected to localize the emitter based on those isochrons producing an uncertainty parallelogram comparing favorably to the CEP or other described criteria.

The reference time and positioning system used to provide a common frame of reference to the receivers may be a system such as the global positioning system (GPS). When GPS is utilized, errors associated with the reference time and positioning of individual receivers may be minimized or reduced by selecting a common constellation of satellites for the reference time and positioning system. This allows common errors to cancel out.

Yet another embodiment expands the emitter locating system to include four or more receivers. These four receivers will produce six distinct isochrons with at least 15 different possible pairs of intersecting isochrons wherein each isochron is associated with a unique pair of receivers. As described in the above, 4 receivers generate 6 isochrons (i.e., 6 receiver pairs). These are explicitly shown in FIG. 8. Given these 6 isochrons, there will be 15 possible isochron pairs each of which normally produces at least one intersection. It is possible for a pair of isochrones to produce two intersections depending on geometry of the receivers and the emitter. The uncertainty parallelogram created by the intersection of any two of these isochrons again may be defined by an area, a major diagonal, and a minor diagonal. The uncertainty parallelogram may be compared based on the area and the ratio of the minor diagonal to the major diagonal or other like criteria. The goal in localizing the emitter is to select a compact parallelogram. In such a compact parallelogram the area is minimized while the ratio of the minor diagonal to the major diagonal is maximized.

Other features and advantages of the present invention will become apparent from the following detailed description of the invention made with reference to the accompanying drawings.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGs., like numerals being used to refer to like and corresponding parts of the various drawings.

The uncertainty region generated by the intersection of two isochrons may be approximated as a parallelogram given sufficient range to the emitter from the antenna/receiver systems. In general, primary factors, which determine the dimensions of this parallelogram for a given set of receivers, include: (1) the widths of each isochron; and (2) the angle formed between the isochrons at their point of intersection. Given two isochrones with fixed widths, the dimensions of the uncertainty region are minimized when the angle between the intersecting isochrons approaches 90 degrees. The uncertainty region becomes unacceptably large when the isochron intersection angle approaches zero degrees. When a large number of spatially-separated antenna/receiver systems are available to measure the TOA of a signal transmitted by the emitter, the selection of antenna/receiver system pairs utilized to generate isochrons that intersect in a favorable manner (such that the target location uncertainty area (uncertainty parallelogram) is minimized to an acceptable value) should be addressed.

Within tactical situations, the available antenna/receiver systems are often geographically concentrated with respect to emitters. In a metropolitan urban environment, a large number of spatially-separated antenna/receiver systems are typically available unless signal blockage and channel conditions limit the available signals. Coastal environments or other geographically constraints often limit the number and geometry of antenna/receiver systems available.

Embodiments of the present invention determine the widths of isochrons generated between receiver pairs based upon a non-spherically symmetric receiver position error, relative navigation and relative timing. The intersection angle between isochrons generated by receivers whose range to the emitter is large with respect to their baseline separation distance may be estimated. Then, the best antenna/receiver system pairs may be chosen to generate TDOA isochrons that provide the smallest target location uncertainty area when the available antenna/receiver systems are geographically concentrated with respect to an emitter of interest. This allows the area of uncertainty in which a limited number of spatially-separated antenna/receiver systems are available to be minimized by choosing antenna/receiver pairs that reduce or minimize the area of uncertainty associated with TDOA-based emitter location techniques.

One embodiment describes a method to select the antenna/receiver system pairs that produce a reduced target location/uncertainty area for cases of three and four receivers that subtend an angle less than 180 degrees with respect to the emitter. This method is easily extendable to cases having more spatially-separated antenna/receiver systems.

Figure 2:
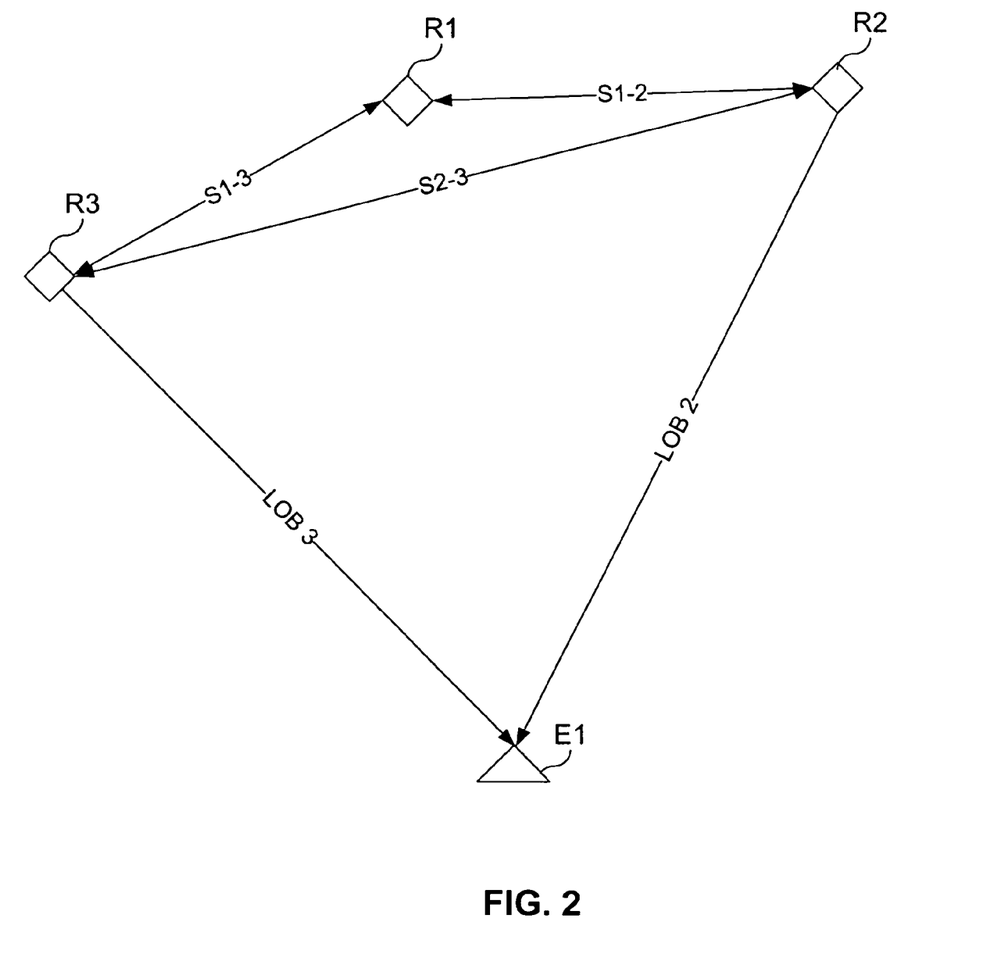
FIG. 2 depicts a direction finding method applied to a three receiver case to localize an emitter.

Direction Finding (DF) methods historically rely upon the principle of interferometry to determine the Line Of Sight (LOS) bearing to an emitter. The accuracy with which an emitter may be located may be optimized utilizing interferometric DF techniques when the baseline separation distance between two antennas is as large as possible and the angle between the two lines of bearing are substantially orthogonal. Thus for the case of three spatially-separated antenna/receiver systems, (R1, R2 and R3) as shown in FIG. 2, the DF accuracy is best when the interferometry uses the longest baseline (i.e. S2-3) between the available antenna/receiver systems, i.e. for the long baseline between the antenna/receiver systems R2 and R3 with respect to emitter E1.

The natural tendency to utilize the longest baseline between the available antenna/receiver systems for interferometric DF presents a "trap" when determining an emitter's location utilizing TDOA techniques. For the case of three available spatially-separated antenna/receiver systems as presented in FIG. 3, three distinct isochrons I12, I13, and I23 may be generated between the possible pairs of systems (R1, R2; R1, R3; and R2, R3). The separation distance between R1 and R2 is shown as distance S12. The separation distance between R1 and R3 is shown as distance S13. The separation distance between R2 and R3 is shown as distance S23. Using these designations and the geometry presented in FIG. 3, the longest baseline distance between the three possible pairs of antenna/receiver systems, i.e. the greatest separation distance between any pair of antenna/receiver systems, is that between R2 and R3, i.e. distance S23. Thus, baseline between R2 and R3 provides the best accuracy using interferometric DF techniques.

This is not necessarily true for TDOA techniques. Of the three available receiver pairs, the baseline between R2 and R3 provides the "thinnest" (i.e., most accurate) isochron (given the baselines between receivers are all relatively normal to the line of sight to the emitter). The key point comes in the selection of two or more "intersecting" DFs or isochrones to determine the emitter location. When using TDOA techniques, one may erroneously overlook the significance of the intersection angle in favor of "thinner" (more accurate) isochrones. In fact, two or more "wider" (less accurate) isochrones associated with shorter baseline distances between receivers which have better geometry (i.e., have a larger intersection angle) often yield a more accurate emitter location than "thinner" (more accurate) isochrones which have a smaller intersection angle. Thus, the longest baseline (which is more accurate in the sense of isochron width), may not be the best selection for use in determining the emitter location due to inherently lower intersection angles with other available isochrones.

For TDOA techniques, one must consider the width of an individual isochron generated by a pair of cooperating receivers and the angle at which the isochron will intersect other isochrons. An analytical expression for the width of an isochron generated between a pair of identical receivers expressed the isochron width as the product of two factors: a measurement factor, M, and a geometrical factor, G. The measurement factor, M, may be thought of as a function of the accuracy with which the cooperating receivers are able to measure the time-difference-of-arrival of the received signal as well as the accuracy with which the positions of the individual receivers are known (assumed to be identical for each receiver).

The measurement factor, M, may be expressed as a function of the individual position errors associated with each receiver, the timing reference error of each receiver, the system-to-system time synchronization error, the clock quantization errors, the time-of-arrival measurement error of each receiver, the hardware measurement errors, the signal processing errors, the timing errors between the receiver time reference and the time reference of the system computing the overall emitter location solution, and the environmental signal propagation errors between the emitter and each of the receivers. Ultimately, the receiver-to-receiver time synchronization error is the primary timing error of concern. Most TDOA systems, multiple timing sources are used (e.g., receiver oscillators/clocks, processor clocks, system time references/clocks, GPS time references/clocks, etc.). These multiple timing sources lead to a decomposition of the "receiver-to-receiver time synchronization error" into the other timing error components which are explicitly mentioned—i.e., "timing reference errors of each receiver," "timing errors between the receiver time reference and the time reference of the system," and one other which is not currently mentioned (but probably intended by this description) which is the "time synchronization error between the system time references of the cooperating systems."

In most TDOA systems, multiple timing sources are used (e.g., receiver oscillators/clocks, processor clocks, system time references/clocks, GPS time references/clocks, etc.). These multiple timing sources lead to a decomposition of the receiver-to-receiver time synchronization error into the other timing error components which are explicitly mentioned—i.e., timing reference errors of each receiver, the system-to-system time synchronization error, the timing errors between the receiver time reference and the time reference of the system. The geometrical factor, G, is a function of the bistatic angle, $\theta$, formed between the two receivers from the perspective of the emitter, and the elevation angle formed between the line-of-sight from the emitter to each receiver and a vector directed towards the center of the earth.

Historically, equal, spherically symmetric position errors for both receivers, as well as identical time-difference-of arrival measurement errors for both receivers have been assumed. Utilizing GPS or other like positioning systems to provide positioning and timing information, allows the horizontal position errors to be (smaller) than the vertical position errors. Furthermore, utilizing the principles of relative navigation and relative timing reduces the GPS-related position and timing errors for the cooperating receivers relative to the "master" receiver in determining the position of the emitter. For relative navigation and relative timing error reduction, the GPS solutions are obtained using similar, if not identical, constellations of GPS satellite vehicles to derive the GPS position and timing solutions. In this manner, the space segment, control segment, and ionospheric propagation errors for the GPS solutions are nearly, if not exactly, identical for a second cooperating receiver relative to the first (the master). Thus, these error contributions cancel for the second receiver's GPS navigation and timing solutions relative to the solutions obtained by the master. Additionally, if the separation distance between the cooperating receivers is not too large, a portion of the tropospheric propagation errors may also cancel in the GPS solutions of the second receiver relative to the solutions obtained by the master. For configurations consisting of three or more receivers utilized to generate intersecting isochrons, one of the receivers is taken to be the master. The GPS position and timing solutions for the other receivers are determined relative to the solution of the master receiver. This reduces the widths of the isochrons used to generate the TDOA emitter location solution. Non-spherically symmetric position error concept as well as the relative navigation and relative timing concepts have been incorporated in the isochron width calculations. Furthermore, the individual error sources contributing to the TDOA measurement errors for each receiver may be expanded into their constituent components.

As previously stated, one isochron is not sufficient to determine the location of the emitter. Rather, two or more isochrons must be generated and their intersection provides an uncertainty region about the emitter's true location. This uncertainty region may be approximated as a parallelogram, whose shape and area depend upon three factors. These factors include the width of the first isochron, the width of the second isochron, and angle at which the isochrons intersect.

Figure 4A:
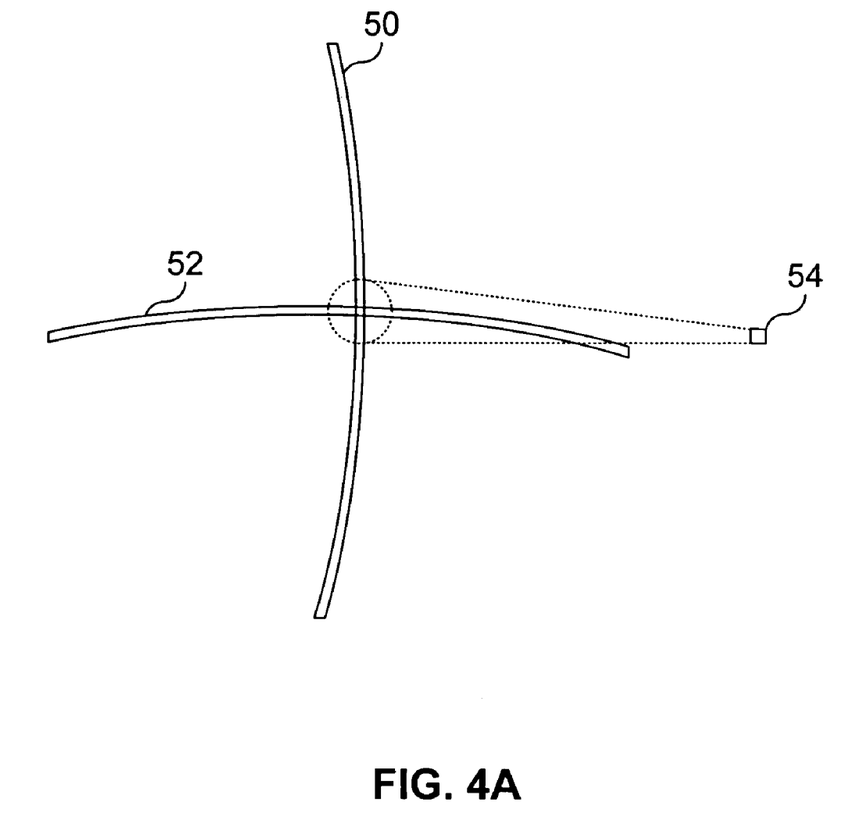
FIGS. 4A, 4B, 4C and 4D depict how these isochron width and intersection angles can effect the emitter geolocation error.
Figure 4B:
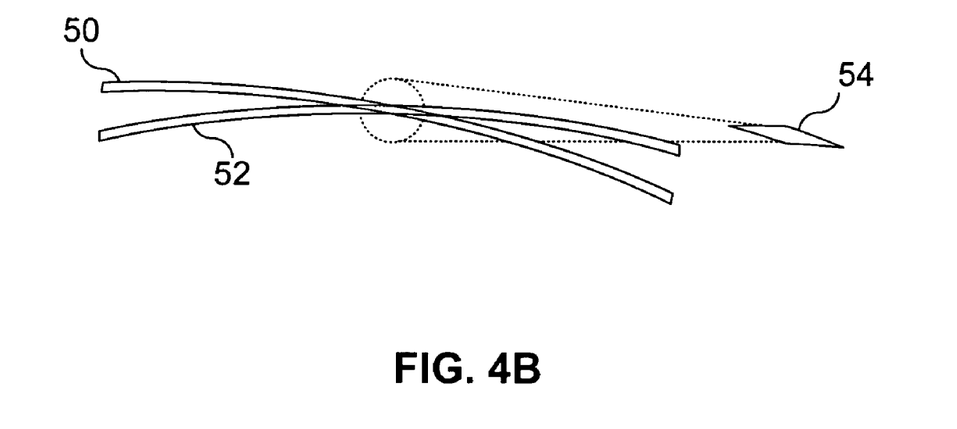
Figure 4C:
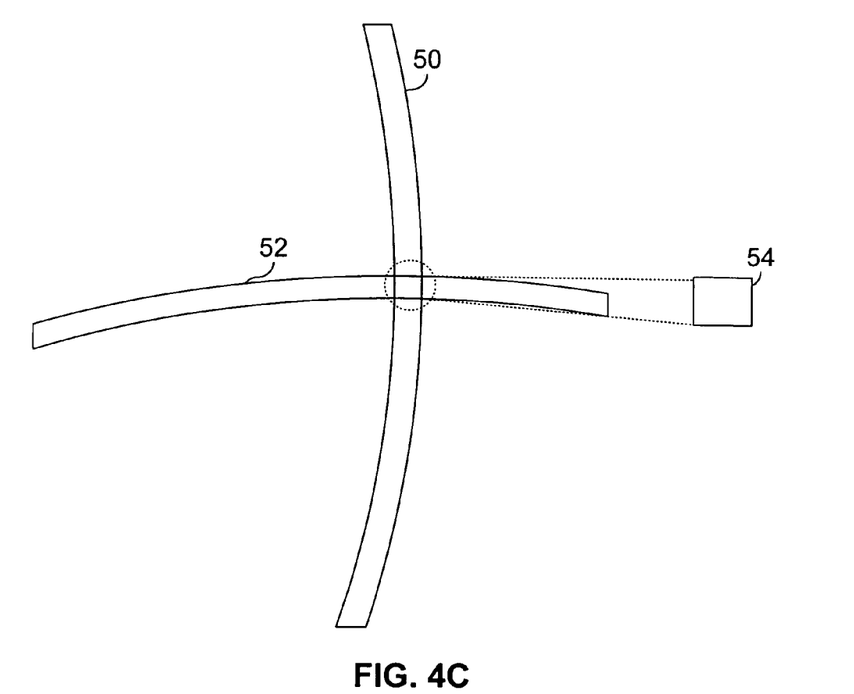
Figure 4D:
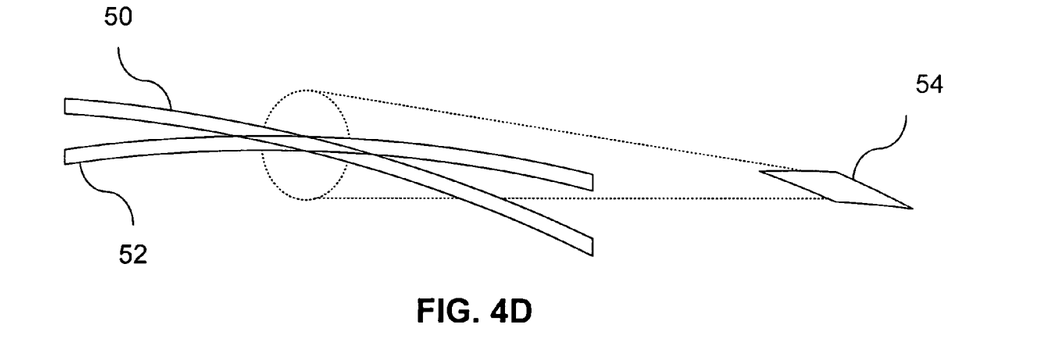

FIGS. 4A, 4B, 4C and 4D depict how these factors determine the emitter geolocation error. FIG. 4A shows a case where isochron 50 and isochron 52 are narrow isochrons having an orthogonal or near orthogonal intersection in order to produce an area of uncertainty 54 that is compact and has a small error associated with it. In FIG. 4B, again isochron 52 and isochron 50 are narrow. However, the angle of intersection is small. This produces a much larger area of uncertainty than that provided in FIG. 4A. Although area 54 may in actuality be a smaller area than that of FIG. 4A, the deviation associated with that error is not as compact. FIGS. 4C and 4D depict that isochrons are all not uniform in thickness. In FIG. 4C, both isochrons 50 and 52 are relatively thick. Additionally, FIG. 4C shows the angle of intersection that being orthogonal or near orthogonal. This produces a larger error of uncertainty than that in FIG. 4A. FIG. 4D shows a worse case where isochrons 50 and 52 are relatively thick isochrons with a relatively small intersection angle. This results in a parallelogram having a large error associated with it. To minimize the error associated with area 54, it is desirable to consider both the width of the intersecting isochrons used and the angle of intersection of those intersections. Additionally, the compactness of area 54 may be evaluated as well.

If one considers a pair of isochrons generated by three or more cooperating receivers. For a given set of isochron widths, the area of the uncertainty parallelogram is minimized when the isochrons intersect at right angles, in which case the parallelogram reduces to a rectangle. Conversely, the uncertainty area reaches a maximum as the isochron intersection angle approaches zero. Thus the lengths of the sides of the parallelogram are determined by the isochron widths and the shape of the parallelogram is determined by the isochron intersection angle. The isochron intersection angle is now addressed.

Figure 3:
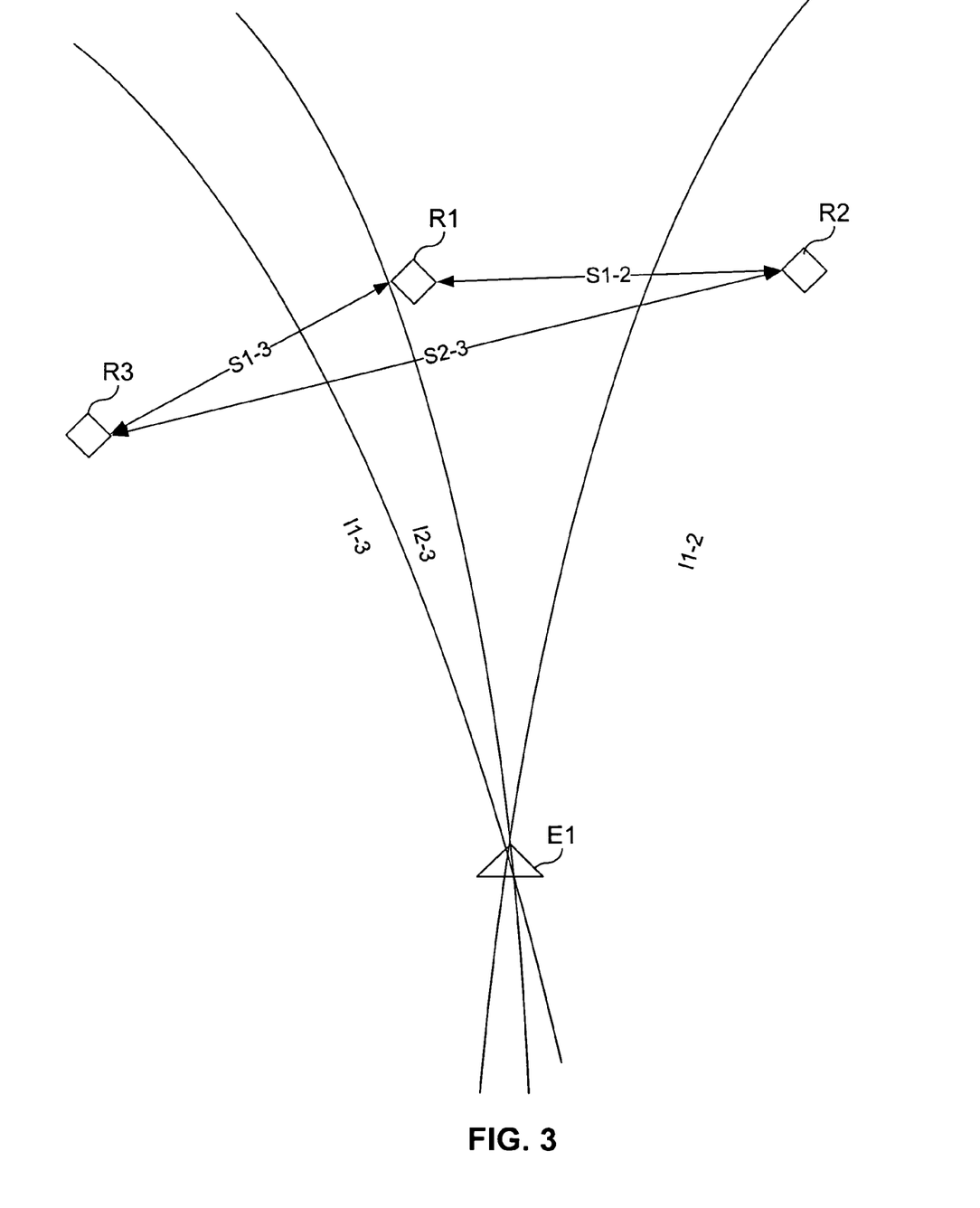
FIG. 3 depicts a time difference of arrival method applied to a three receiver case to localize an emitter in accordance with an embodiment of the present invention.

Consider the three receivers R1, R2, and R3 of FIG. 3 spatially separated with respect to an emitter E1. R1 is located between R2 and R3. R1 and R2, with a baseline separation distance designated S12, generate a TDOA isochron I12 based upon their different reception times of a signal transmitted from the emitter. Isochron I13 is generated between R1 and R3, where S13 designates their baseline separation distance. R1 and R2 form the bistatic angle θ12 with respect to the emitter and the bistatic angle θ13 is formed between R1 and R3. The tangent to the isochron I12 at the emitter location, denoted T12, bisects the bistatic angle θ12 between R1 and R2. Similarly, the tangent to the isochron I13 at the emitter location, denoted T13, bisects the bistatic angle θ13 between R1 and R3. Note that these approximations are only viable at substantially long ranges between the receivers and the emitter relative to the baseline length between receivers. (i.e., the asymptotes of the hyperbola actually bisect the "bistatic angle"—not the actual tangent.) For shorter ranges to the emitter (or for longer baselines), a more accurate method is to use the inverse cosine of the dot product of the tangent unit vectors at the point of isochron intersection. Isochrons I12 and I13 intersect at the location of the emitter. The angle with which the isochrons intersect is the angle formed between the tangents T12 and T13 with respect to the emitter. Therefore, knowledge of the receiver locations (from which their baseline separations are deduced) and an approximate emitter location (determined via DF or some other method) may be utilized to estimate the intersection angle between the isochrons produced between the cooperating receivers.

The three factors that determine the emitter location solution accuracy have thus been addressed herein. Non-spherically symmetric receiver position errors as well as relative navigation and relative timing concepts are utilized to determine the widths of two intersecting isochrons. Additionally, the isochron intersection angle is determined based upon the geometry of the receivers with respect to the emitter. Together, this information provides the size and shape of a parallelogram from which the TDOA emitter location solution accuracy is obtained. A methodology for the selection of receiver pairs that generate isochron intersections to optimize the emitter location uncertainty may now be applied.

Figure 5:
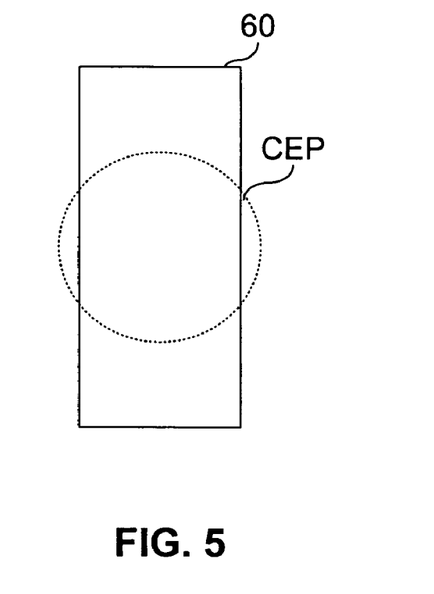
FIG. 5 depicts an uncertainty parallelogram that approaches a rectangle as the angle of intersection approaches orthogonality.
Figure 6:
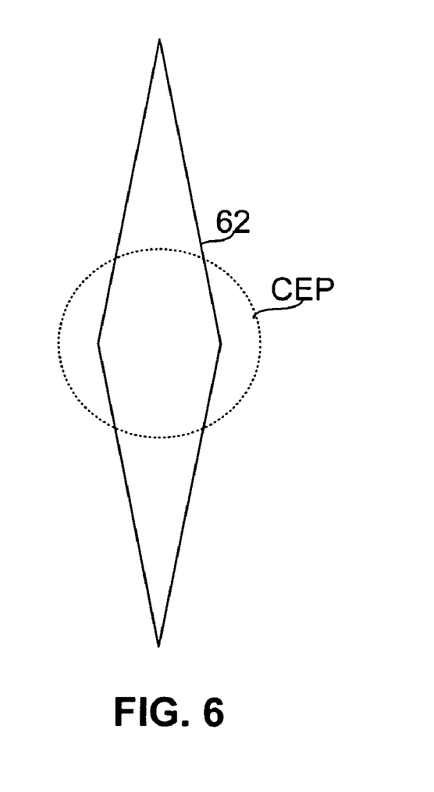
FIG. 6 depicts an uncertainty parallelogram and CEP for substantially non-orthogonal intersection angles.
Figure 7:
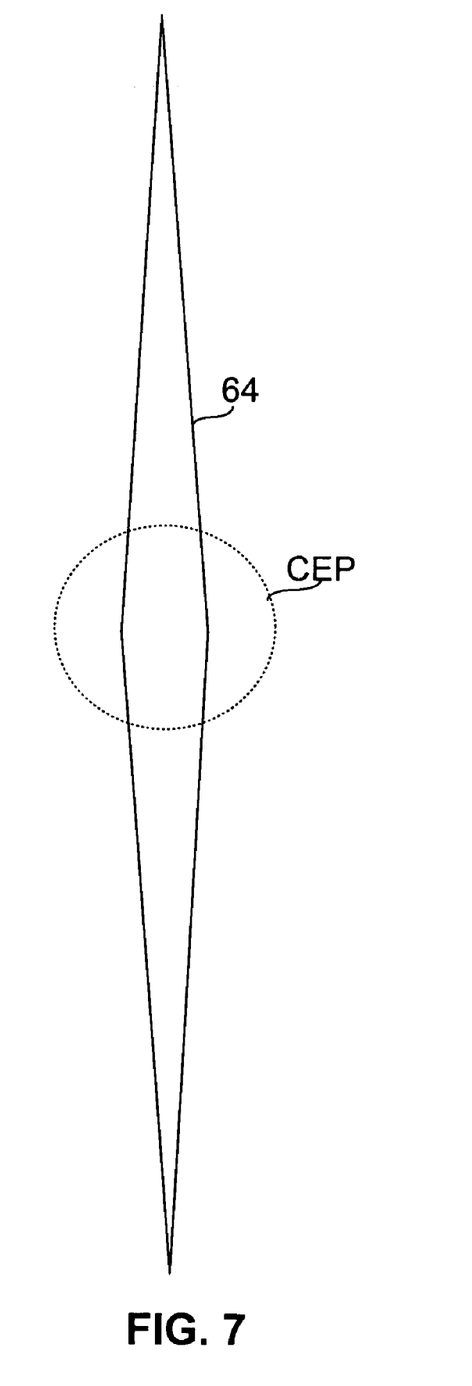
FIG. 7 depicts a second uncertainty parallelogram and CEP for substantially non-orthogonal intersection angles.

Pairs of cooperating receivers should be selected that produce isochron intersections that minimize the target uncertainty region for an arbitrary geometrical distribution of receivers with respect to an emitter. A common practice quantifies the accuracy with which an emitter's true location may be determined using the Circular Error Probable (CEP) statistical figure of merit. In this context the CEP defines the radius of a circle that has a 50% probability of containing the true emitter location. The CEP target location accuracy metric is an intuitively understandable and useful quantity for large TDOA isochron intersection angles (i.e. near normal intersections), such that the shape of the resulting parallelogram approaches a rectangle 60 as shown in FIG. 5. For small isochron intersection angles, there is a large dissimilarity between the area of the target location uncertainty parallelogram 62 and 64 of FIGS. 6 and 7 and the corresponding circular area defined by the CEP. In fact for small TDOA isochron intersection angles, the use of the CEP parameter can sometimes lead to misleading conclusions. For this reason, the CEP target location error metric is deemed for the discussion herein to be inappropriate for quantifying TDOA emitter geolocation performance. A more appropriate figure-of-merit is taken to be the area of the parallelogram produced by the intersecting TDOA isochrons. The area of the parallelogram is given by the product of the two isochron widths divided by sine of the intersection angle. The isochron intersection may also be further described by comparing the ratio of the minor diagonal to the major diagonal of the uncertainty parallelogram, which is a measure of the elongation or compactness of the parallelogram. The ratio of the diagonals is a measure of the "elongation" or "compactness" of the parallelogram.

Returning to the three isochrons, I12, I13, and I23 from FIG. 3 that have been generated between the three cooperating receivers, R1, R2, and R3. The baseline separation distance between R2 and R3, i.e. S23, is longer than the S12 and S13 baselines. Therefore, the isochron I23 has a narrower width than either of the I12 or I13 isochrons. However, the angle at which the isochron I23 intersects either I12 or I13, is much smaller than the intersection angle between I12 and I13 isochrons. In fact, the intersection of the I12 and I13 isochrons produces a smaller and more compact parallelogram area than the intersection of I23 with I12 or the intersection of I23 with I13 over a wide range of emitter-receiver geometries. Thus for the case of three spatially separated receivers, the area of the target location uncertainty parallelogram is minimized when the R1 and R2, and R1 and R3 receiver pairs are utilized to generate intersecting TDOA isochrons for a wide range of emitter-receiver geometries. In other words, the intersection of the narrow I23 isochron and either of the wider isochrons, I12 or I13, occurs at significantly smaller angles than the intersection angle between the larger width isochrons I12 and I13. Small isochron intersection angles associated with I23 produce parallelograms whose major diagonal is very elongated with respect to the minor diagonal. Such a relationship between the major and minor diagonals produces an unnecessarily large target location uncertainty region. It should be noted that for very asymmetrical geometries, with either R2 or R3 located close to R1, and with the other receiver situated considerably far from R1, circumstances may be encountered where the intersection of I23 with one of the other isochrons produces results comparable with the intersection of I12 and I13. In this case the most favorable isochron intersection is the one that produces a parallelogram with the smallest area. If CEP is a concern, the elongation of the ellipse should also be factored into the selection of the most favorable isochrons. It turns out for the three-receiver case that, in general (but not always), the intersection between I12 and I13 also produces a smaller CEP target location error for a wide range of emitter-receiver geometries. This is not true in general (e.g., four receiver case with two pairs each separated by very short baselines with a very long baseline between the two pairs. The two short baselines may intersect with a more favorable geometry (less elongation and hence largest minor-to-major diagonal ratio), but due to the thickness of the two isochrones produce a parallelogram with a larger area than if one of the long baselines had been used. It is true that in the three receiver case, the most favorable parallelogram (smallest area) also has the least amount of elongation.

To summarize, for three spatially separated antenna/receiver systems; in contrast to interferometric DF techniques, for emitter location using TDOA the optimum emitter location performance (the smallest target location uncertainty parallelogram area) is generally obtained from the intersection of isochron I1-2 and isochron I1-3, i.e. the isochrons formed with the center antenna/receiver system common to the generation of both isochrons. This result is somewhat counter-intuitive to the principles of interferometry.

Figure 8:
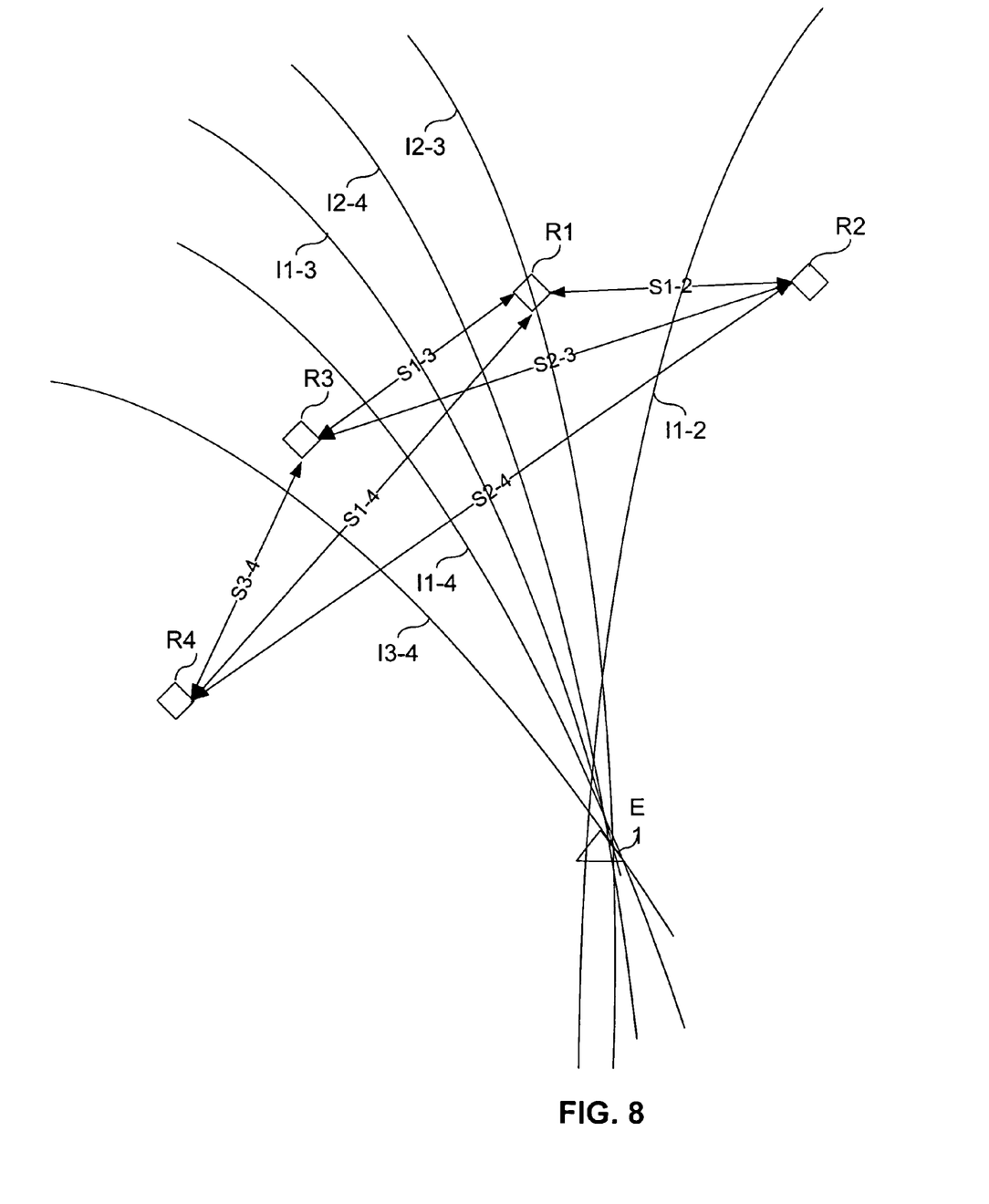
FIG. 8 depicts a time difference of arrival method applied to a four or more receivers to localize an emitter in accordance with an embodiment of the present invention.

Now consider the case of four or more spatially separated receivers, R1, R2, R3, and R4 as shown in FIG. 8. For similarity to the three receiver case of FIG. 3, R4 is added to the receiver constellation on the side of R3 opposite from R1. Here, from the perspective of the emitter, the receivers are from left to right R4, −R3, −R1, and R2. With four spatially separated receivers, one may generate at least 15 unique isochron intersections using the different pairs of cooperating receivers. These 15 isochron intersections include the three isochron intersection combinations discussed above involving R1, R2, and R3 (i.e. I12 with I13 (R1 common), I12 with I23 (R2 common), and I13 with I23 (R3 common)). Of the remaining 12 isochron intersections, only three of these utilize all four of the receivers to generate two intersecting isochrons. The remaining nine intersections involve isochrons generated utilizing only three of the four available receivers, where one of the three receivers is common to both isochrons: (i.e. I12 with I14 (R1 common), I13 with I14 (R1 common), I12 with I24 (R2 common), I23 with I24 (R2 common), I13 with I34 (R3 common), I23 with I34 (R3 common), I14 with I24 (R4 common), I14 with I34 (R4 common), and I24 with I34 (R4 common)).

The three cases in which all four receivers are utilized to generate an isochron intersection is now discussed; these cases include: I12 with I34, I14 with I23, and I13 with I24. For the geometry under consideration, the isochron intersection I13 with I24 does not produce a favorable result since the isochron intersection angle is very small relative to the other possible four-receiver isochron intersections. Isochrons I12 and I34 have large relative widths due to the comparative proximity of R1 to R2 and of R3 to R4; however, the intersection angle, $\psi$12-34, between I12 and I34 is large compared to the intersections of the other 14 possible isochron intersections. Isochrons I14 and I23 have smaller, medium-sized widths relative to I12 and I34, since the separation distance, S14, between R1 and R4 and the separation distance, S23, between R2 and R3 is greater than the separation distances S12 and S34, respectively. The isochrons I14 and I23 also have an intersection angle, $\psi$14-23, that is smaller than $\psi$12-34. Thus the comparison of viable cases that utilize all four receivers is made between the intersection of I12 with I34, which involves relatively large-width isochrons intersecting at a relatively large angle, and the intersection of I14 with I23, which involves medium-width isochrons intersecting at a more moderate angle.

In general, the case of I14 intersecting with I23 produces a smaller target location uncertainty parallelogram area than the intersection of I12 with I34 over a wide range of four-receiver geometries. The intersection of I14 with I23 also generally (but not always) produces a smaller CEP target location error than the other possible isochron intersections over a multitude of geometries. There are possible geometrical distributions of four receivers about an emitter for which the intersection of isochrons I12 and I34, as well as other three-receiver isochron intersections produce a parallelogram area (and CEP value) better than that provided by the intersection of I14 with I23 (more often than not this occurs for very asymmetrical receiver geometries). The intersection of I14 and I23, however, generally produces the best target location performance for a wide variety of receiver-emitter geometries. As with the three-receiver discussion above, when circumstances are encountered in which different isochron intersection combinations produce comparable parallelogram areas, the most favorable isochron intersection is the one that produces a parallelogram with the largest minor diagonal to major diagonal ratio. In other words, the most favorable isochron intersection in this case is the one that produces a parallelogram with the least amount of elongation.

Selecting the appropriate isochron intersection may be extended to receiver configurations that involve five or more receivers. Since a maximum number of four receivers are needed to generate two intersecting isochrons, configurations of five or more receivers are simply decomposed into a subset of the three or four receivers that provides the most favorable geometry to produce a pair of intersecting isochrons with a minimum parallelogram area.

Figure 9:
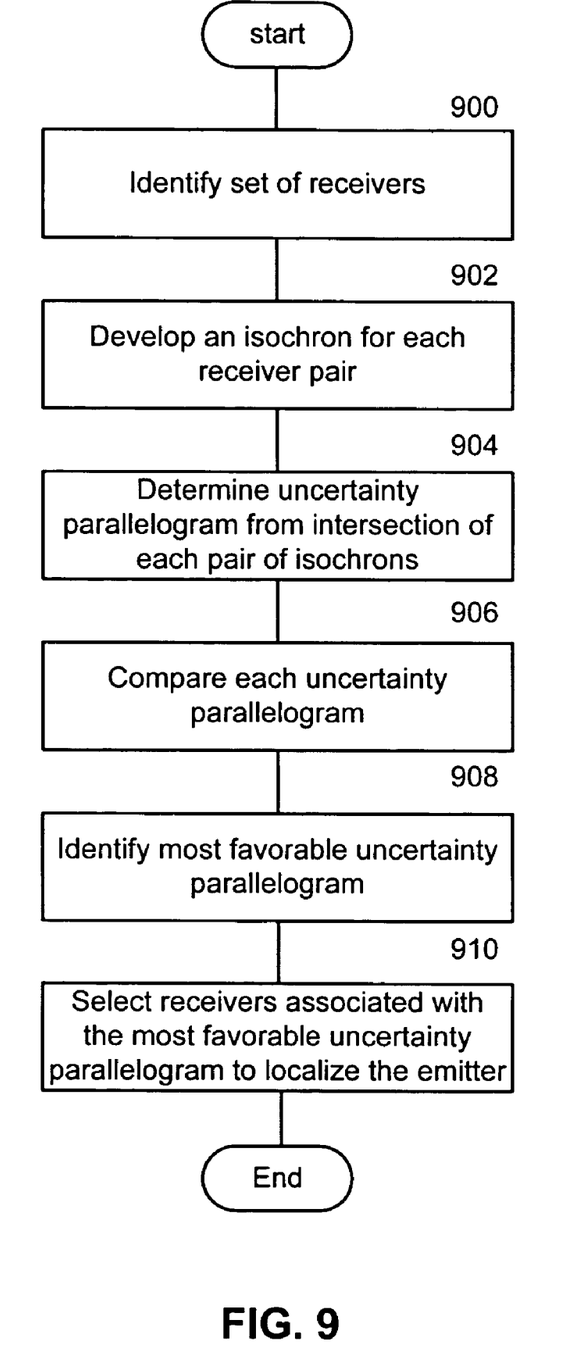
FIG. 9 is a logical flow diagram that illustrates one method employing time difference of arrival techniques to identify a favorable set of receivers with which to localize an emitter.

FIG. 9 is a logical flow diagram that illustrates one method employing time difference of arrival techniques to identify a favorable set of receivers with which to localize an emitter. A processor or processing module may be coupled to the receivers to perform these steps. The processing module may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions of FIG. 9 via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory stores, and the processing module executes, operational instructions corresponding to at least some of the steps and/or functions illustrated in FIG. 9.

In step 900, a set of receivers are identified. As shown in FIG. 3 and FIG. 8, at least three receivers are required. FIG. 8 utilizes four receivers and an embodiment of the present invention may utilize even may expand this beyond four receivers. An isochron is developed for each receiver pair in step 902 wherein each isochron defines a hyperboloid of a finite width within which the emitter is located. The intersection of multiple isochrons developed in step 902 will produce an uncertainty parallelogram. The uncertainty parallelogram will localize the emitter where the uncertainty parallelogram may be defined by the width and angle of intersection of each isochron pair. Each uncertainty parallelogram developed in step 904 may be compared in step 908.

The goal is to identify a compact parallelogram. This may involve comparing the parallelogram to a circular error probability (CEP), or the analysis for the base on the area of the parallelogram and a ratio of the minor diagonal to the major diagonal of the parallelogram. It is desired to reduce the uncertainty and localize the emitter by minimizing the area of the parallelogram while maximizing the ratio of the minor diagonal to the major diagonal of the parallelogram. This occurs when the widths of the parallelogram are minimized and the angle of intersection of the isochrons is substantially orthogonal or subtends a relatively large angle. The comparison of parallelograms in step 906 results in the identification of a favorable uncertainty parallelogram in step 908. With this information, receivers associated with the development of the most favorable parallelogram may be used to localize the emitter in step 910.

In summary, the present invention provides systems and methods to select receiving pairs from a set of at least three receivers in order to localize an emitter. This involves identifying the set of at least three receivers to be used to localize the emitter. An isochron may be developed for each receiver pair wherein each isochron has a finite width. The intersection of two isochrons creates an uncertainty parallelogram. When the intersection of two isochrones is substantially orthogonal or subtends a relatively large angle, uncertainty based on the intersection angle is minimized and uncertainty becomes primarily a function of isochron width. To determine acceptable or best receiver pairs to be used, the intersections of each isochron pair may be analyzed. The uncertainty parallelograms and intersection angles are compared for each pair of intersecting isochrons. Then, receiver pairs that produced the isochrons that result in a reduced or compact uncertainty parallelogram may be selected.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions and alterations can be made hereto without departing from the spirit and scope of the invention as described by the appended claims.

What is claimed is:

1. A method of determining the location of an emitter disposed proximate to the Earth's surface, the method comprising:
   (a) receiving a signal from the emitter with a first pair of receivers;
   (b) measuring the signal time difference of arrival between the receivers;
   (c) producing a hyperboloid of revolution from the measured signal time difference of arrival between the first pair of receivers, wherein the emitter is within a first isochron defined by the intersection of the hyperboloid of revolution and the Earth's surface, the isochron having a width that is a function of the receiver pair and emitter geometry;
   (d) repeating steps (a)-(c) with a second pair of receivers to define a second isochron that intersects with the first isochron to form an intersection and repeating steps (a)-(c) with a third pair of receivers to define a third isochron that intersects with the first isochron to form an intersection and second isochron to form an intersection, wherein each intersection defines a parallelogram;
   (e) measuring the area of each parallelogram and determining the parallelogram having the smallest area;
   (f) identifying the receiver pairs associated with the two intersecting isochrones whose intersection forms the smallest parallelogram; and
   (g) determining the emitter location using the identified receiver pairs,
   wherein each parallelogram has a first pair of oppositely facing angles of equal size, a second pair of oppositely facing angles of equal size, a first diagonal defined by the distance between the first pair of oppositely facing angles and a second diagonal defined by the distance between the second pair of oppositely facing angles, and when the measured area of the two smallest parallelograms is substantially the same, the method further comprises measuring the first and second diagonals, identifying the longer diagonal and the shorter diagonal, determining a ratio of the shorter diagonal over the longer diagonal, and identifying the parallelogram having the maximum ratio of the shorter diagonal over the longer diagonal.

2. The method of claim 1 further comprising identifying the pair of receivers associated with the parallelogram having the maximum ratio of the shorter diagonal over the longer diagonal.

3. The method of claim 1, further comprising repeating steps (a)-(c) with additional pairs of receivers.

4. A system for locating an emitter that emits signals, the system comprising:
   (a) three pairs of receivers configured to receive the signals; and (b) and a processor operatively coupled to the receivers, the processor configured to define an isochron based on the signals received by each receiver pair, wherein each isochron intersections every other isochron thereby defining a parallelogram at each intersection, the processor further configured to estimate the area of each parallelogram, identify the parallelogram having the smallest area, identify the two pairs of receivers associated with the intersecting isochrons forming the parallelogram having the smallest area, and locate the emitter using the two pairs of receivers associated with the intersecting isochrons forming the parallelogram having the smallest area, wherein each parallelogram has a first pair of oppositely facing angles of equal size, a second pair of oppositely facing angles of equal size, a first diagonal defined by the distance between the first pair of oppositely facing angles, and a second diagonal defined by the distance between the second pair of oppositely facing angles; and when the measured area of the two smallest parallelograms is substantially the same, the processor is further configured to measure the first and second diagonals, identify the longer diagonal and the shorter diagonal, determine a ratio of the shorter diagonal over the longer diagonal, and identify the parallelogram having the maximum ratio of the shorter diagonal over the longer diagonal.

5. The system of claim 4 further comprising additional pairs of receivers to receive emitter signals, and the processor further configured to define an isochron associated based on a signal received by each pair of receivers, wherein each isochron intersections every other isochron thereby defining a parallelogram at each intersection, the processor further configured to estimate the area of each parallelogram, identify the parallelogram having the smallest area, identify the two pairs of receivers associated with the intersecting isochrons forming the parallelogram having the smallest area, and locate the emitter using the two pairs of receivers associated with the intersecting isochrons forming the parallelogram having the smallest area.

6. The system of claim 5, wherein each parallelogram has a first pair of oppositely facing angles of equal size, a second pair of oppositely facing angles of equal size, a first diagonal defined by the distance between the first pair of oppositely facing angles, and a second diagonal defined by the distance between the second pair of oppositely facing angles; and when the measured area of the two smallest parallelograms is substantially the same, the processor is further configured to measure the first and second diagonals, identify the longer diagonal and the shorter diagonal, determine a ratio of the shorter diagonal over the longer diagonal, and identify the parallelogram having the maximum ratio of the shorter diagonal over the longer diagonal.

* * * * *